Oct. 11, 1932.  G. K. LEWIS  1,881,733
METHOD OF JOINING COMPOSITE PANELS
Filed Aug. 16, 1930
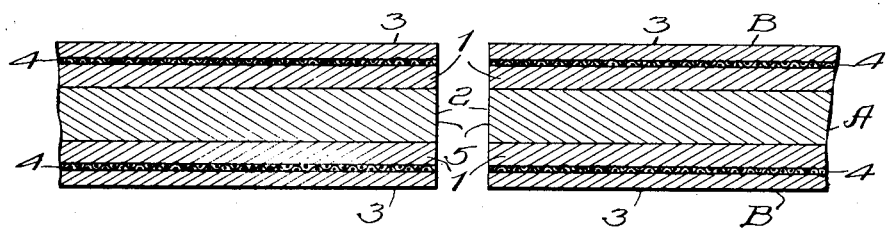
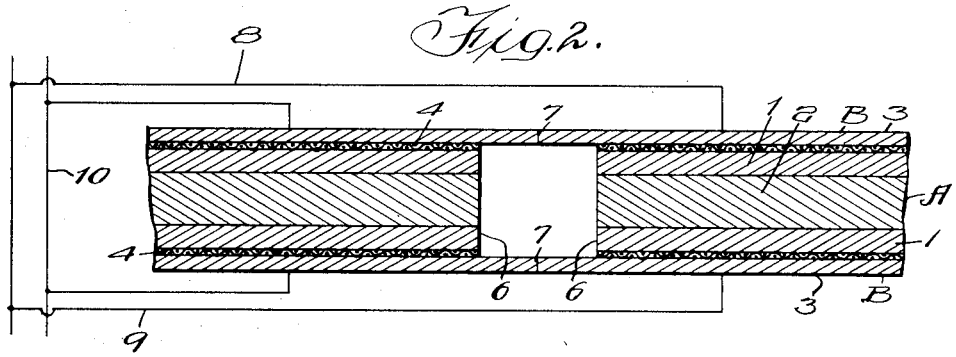
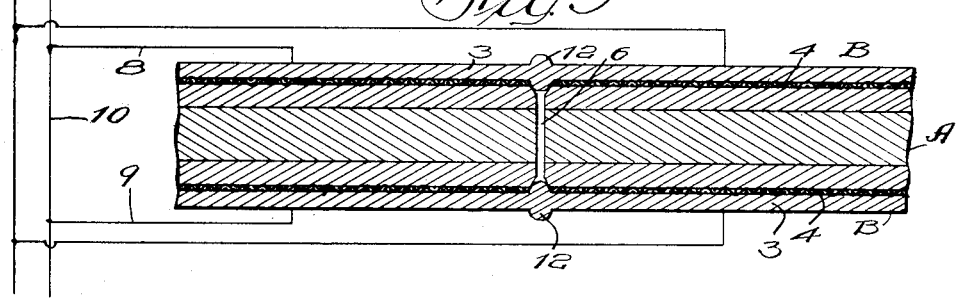
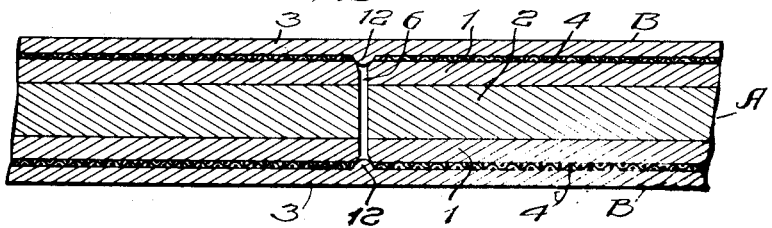
Witness:
William P. Kilroy
Inventor:
George K. Lewis
By George I. Haight
Atty.

Patented Oct. 11, 1932

1,881,733

UNITED STATES PATENT OFFICE

GEORGE K. LEWIS, OF CHICAGO, ILLINOIS, ASSIGNOR TO MET-L-WOOD CORPORATION, OF CHICAGO, ILLINOIS, A CORPORATION OF ILLINOIS

METHOD OF JOINING COMPOSITE PANELS

Application filed August 16, 1930. Serial No. 475,742.

My invention relates to improvements in joining composite laminated panels.

The object of the invention is to provide a method whereby the edges of panels of laminated panels having relatively thin exterior metallic sheathing may be joined in abutting relation in a manner which will be permanent, as strong as the panels themselves and capable of being finished off to eliminate the appearance of a joint.

Other objects of the invention will appear hereinafter.

In the accompanying drawing, which illustrates my invention,

Figure 1 is a sectional view of two composite panels to be joined in abutting edgewise relation;

Figure 2 is a similar section of said panels with portions of the core removed preparatory to joining the edges;

Figure 3 is a similar section showing the completed joint; and

Figure 4 is a similar section showing the excess metal removed from the joint in the outer faces.

The views shown in the drawing are greatly enlarged over the thickness of the actual structure for the purpose of better illustrating the invention.

Composite panel structures of the type for which my invention is particularly applicable are relatively thin and are made up of lamination of sheet metal and fibrous materials, such as wood. The fibrous or wood material forms the core or body A and the metal lamination B constitutes exterior sheathing. The core or body is generally made up of sheets or layers of wood 1 and 2 superposed one upon the other and glued together. In the structure shown, the core or body is made of three layers of wood, the middle or intermediate layer 2 of which is of relatively greater thickness than the two outside layers, and arranged with its grain disposed at right angles to the outer layers. If the panel is single-sheathed, a sheet of metal 3, generally steel, is provided on one face of the core, whereas, if double-sheathed, the sheet steel 3 is provided on both faces of the core. A bonding fabric 4 is interposed between the sheet steel and the face of the core and glued thereto, whereupon the whole structure is compressed to bring the several laminations into intimate contact.

Manufacturing and handling limitations make it difficult to produce panels beyond a certain size in length and width, but requirements often demand larger panels and it becomes necessary to join the smaller sections together to form these larger panels.

Since panels of this character are relatively thin, about ¼ to ₅⁄₁₆ inch, it is difficult to properly join them edgewise. The joint must be made in the metal sheathing.

In accordance with my invention, I provide a welded joint in such manner that the sheathing of adjoining panels is integrally joined. Figure 1 shows two panels with their edges 5 to be joined cut at right angles to the plane of the panels. The laminated core A is cut away to form channels 6 along the edges to be joined, leaving the edge portions 7 of the metal sheathing overhanging the core, as shown in Figure 2. The edges 7 of the metal sheets are then placed in abutting relation, and a suitable electric current is applied to the sheathing through the connections 8 and 9 from a source 10 of current. The passage of current from the sheathing of one panel to the other causes an arc where the edges 7 contact, and develops the necessary heat to fuse the edge portions together. Suitable pressure is applied edgewise of the panels which causes the metal along the edges to form a bead or weld 12, and this shortens the sheathing by the amount of metal which flows into the weld bead 12. For this reason the channels formed by removing the core are preferably made of just sufficient depth, that when the panels move toward each other during the welding operation, the edges 13 of the cores will be brought into closely adjacent relation, there being just enough space between them to provide for the portions 12 of the bead which project into the interior of the panel as shown in Figure 3. Thus the metal sheathing will be supported or backed up by core or body immediately at the joint, and, in effect, form a continuous structure. Upon completion of the weld, the portions of the beads 12 projecting outwardly are ground off or otherwise removed to the level of the surface of the sheathing, which leaves the surface smooth, continuous and without any trace of a joint. By welding the edges of smaller panels in this manner, larger panels of any size can be built up, having all of the strength and jointless appearance of a single panel.

I claim:

1. The method of joining, in edgewise abutting relation, composite panels having metal sheathing, consisting in removing the core of said panels contiguous to the edges to be joined, welding the edges of the metal sheathing together and forcing the panels edgewise while welding to bring the edges of the core in close relation.

2. The method of joining together in edgewise relation composite panels comprising laminated core and metal sheathing, consisting in removing the core portions adjacent the edges to be joined to leave overhanging edges of the metal sheathing, placing the edges of the metal sheathing in welding relation and welding said edges together, and forcing said panels together while welding to close the space between the edge portions of the core.

3. The method of joining together in edgewise relation composite panels comprising superposed laminated core and metal sheathing, consisting in removing sufficient of the core adjacent the edges to provide overhanging metal edges and heating said edges and forcing said panels sufficiently edgewise to upset the metal edge portions and form beading of the metal along the weld and to simultaneously bring the core edge portions into closely adjacent relation.

4. The method of joining together in edgewise relation composite panels comprising superposed laminated core and metal sheathing, consisting in removing sufficient of the core adjacent the edges to provide overhanging metal edges and heating said edges and forcing said panels sufficiently edgewise to upset the metal edge portions and form beading of the metal along the inner and outer faces of the sheathing weld and to simultaneously bring the core portions into closely adjacent relation, and removing the portions of the bead on the outer surface of the sheathing to a point flush with the plane of said surface.

5. A composite panel formed of a plurality of smaller composite panels disposed in the same plane and comprising cores of laminated wood and metal sheets enclosing said core, said metal sheets of adjacent smaller panels having their edges welded together and faced off flush with the outer surface of said metal sheets.

6. A composite panel formed of a plurality of smaller composite panels disposed in the same plane and comprising cores of laminated wood and metal sheets enclosing said core, said metal sheets of adjacent smaller panels having their edges welded edgewise together and faced off flush with the outer surface of said metal sheets, and having beading on their inner faces formed by the weld projecting into the interior of the panels and having their core edges in close proximity.

In witness that I claim the foregoing I have hereunto subscribed my name this 13th day of August, 1930.

GEORGE K. LEWIS.